United States Patent [19]
Murphy

[11] 4,266,741
[45] May 12, 1981

[54] MOUNTING APPARATUS FOR FAN JET ENGINE HAVING MIXED FLOW NOZZLE INSTALLATION

[75] Inventor: Patrick Murphy, Bellevue, Wash.

[73] Assignee: The Boeing Company, Seattle, Wash.

[21] Appl. No.: 908,080

[22] Filed: May 22, 1978

[51] Int. Cl.² .................... B64D 27/00; B64D 27/12
[52] U.S. Cl. .................................. 244/54; 248/554; 60/226 R
[58] Field of Search ............... 244/53 R, 54; 248/554, 248/557; 60/39.31, 262, 226 R

[56] References Cited

U.S. PATENT DOCUMENTS

| | | |
|---|---|---|
| 2,815,184 | 12/1957 | Westphal et al. ............. 244/54 |
| 3,042,349 | 7/1962 | Pirtle et al. ............. 248/554 |
| 3,063,661 | 11/1962 | Smith ............. 244/54 |
| 3,222,017 | 12/1965 | Bobo ............. 244/54 |
| 3,352,114 | 11/1967 | L'Wilde et al. ............. 244/54 |
| 3,397,855 | 8/1968 | Newland ............. 244/54 |
| 3,592,421 | 7/1971 | Kopp ............. 244/54 |
| 3,675,418 | 7/1972 | Lenkeit et al. ............. 248/554 |
| 3,750,983 | 8/1973 | Morris ............. 244/54 |
| 3,753,140 | 8/1973 | Hasbrouck et al. ............. 248/554 |
| 3,809,340 | 5/1974 | Dolgy et al. ............. 244/54 |
| 3,831,888 | 8/1974 | Baker et al. ............. 244/54 |
| 3,837,602 | 9/1974 | Mullins ............. 244/54 |
| 3,844,115 | 10/1974 | Freid ............. 244/54 |
| 3,848,832 | 11/1974 | Stanley ............. 244/54 |
| 3,907,220 | 9/1975 | Amelio ............. 244/54 |

FOREIGN PATENT DOCUMENTS

| | | | |
|---|---|---|---|
| 506645 | 5/1939 | United Kingdom ............. | 244/54 |
| 1236917 | 6/1971 | United Kingdom ............. | 248/554 |
| 1504290 | 3/1978 | United Kingdom ............. | 60/39.31 |

Primary Examiner—Galen L. Barefoot
Attorney, Agent, or Firm—Hughes, Barnard & Cassidy

[57] ABSTRACT

A main thrust link having a forward end connected to the engine core housing at a first forward location, and extending rearwardly and moderately upwardly therefrom to connect to a main support structure at a second rearward location. Connected to the rear of the engine core housing is a rear support device designed to resist vertical loads generally parallel to the vertical force component exerted by the main thrust link, and also to resist side loads. There is a forward connecting device interconnecting the fan casing with the support structure at a location forward of the forward connecting location of the main thrust link. This forward support device comprises a plurality of tangential links connecting to the fan casing at evenly spaced locations around the circumference of the fan casing, thus resisting not only vertical loads, but also resisting torsional loads and side loads on the engine. The forward and rear support devices exert a force couple substantially balancing the force couple created by the thrust link co-acting with the thrust force developed by the engine, and the forward and rear support devices additionally distribute the bending moments on the engine on both sides of the forward connecting location of the thrust link to diminish the maximum bending moment exerted on the engine.

8 Claims, 6 Drawing Figures

MOUNTING APPARATUS FOR FAN JET ENGINE HAVING MIXED FLOW NOZZLE INSTALLATION

BACKGROUND OF THE INVENTION

A. Field of the Invention

The present invention relates to an apparatus for mounting a jet engine in an aircraft, and more particularly for mounting a fan jet engine having a mixed flow nozzle installation.

B. Brief Description of the Prior Art

In providing a supporting structure for a jet engine, obviously the supporting structure must be designed to support the dead weight of the engine when the engine is not in its operating mode. However, since the thrust force developed by modern day jet engines are generally many times greater than the weight of the engine itself, a more critical design problem is that of supporting the engine in a manner that these thrust forces are properly transmitted from the engine into the aircraft structure. This in turn presents two major considerations. First, there is the problem of how these loads are received into the adjacent airplane structure so that these loads are properly distributed therein. Second, there is the consideration of how the support structure reacts these loads into the engine structure itself in a manner that the engine structure is not over-stressed by any particular location.

With regard to the latter problem, the engine components operate at a very high rotational speed, and for the engine to operate efficiently, it's necessary that the clearance between the rotating components (particularly in the compressor section of the engine) maintain a very close tolerance with the surrounding housing structure. Thus, any force which would tend to bend, warp or otherwise deform the housing structure of the engine structure even to a moderate degree must be alleviated. One means of doing this would, of course, be simply to reinforce the housing structure to the extent that it would be able to withstand substantial loads thereon with substantially no deformation. However, this unnecessarily adds to the overall weight of the engine. Therefore, careful consideration must be given to the support structure with regard to the magnitude and location of the forces which are transmitted from the engine structure into the adjacent support structure and ultimately to the airplane structure itself.

The present invention is concerned particularly with the problems of mounting a fan jet engine, such as the General Electric CF6-50 engine, to the leading edge of a wing, with the engine having a mixed flow nozzle installation where the jet exhaust is discharged over the upper surface of the wing. By way of a background information, let us first give consideration to several aspects of the General Electric CF6-50 engine. This engine was designed with separate fan and primary exhaust nozzles, with the fan housing being connected directly to the core housing of the engine and the support structure for the engine connecting directly from the engine core housing to adjacent airplane structures. Specifically, there is an upwardly and rearwardly extending main thrust link which connects from the core engine housing to adjacent airplane structure, and it is this thrust link which resists the main thrust loads developed by the engine. The fan duct of this engine is in itself a source of substantial aerodynamic drag, and this drag force is transmitted directly to the engine core housing. Thus, the drag on the fan duct acts in a direction opposite to the thrust developed by the engine, and thus alleviates to some extent the total force exerted on the main thrust link. There are two other connecting members at the front and rear ends of the engine core housing to resist vertical, lateral and torsional loads.

However, when this same type of fan jet engine (i.e. an engine similar to the General Electric CF6-50) is adapted for installation directly to the wing with a mixed flow nozzle installation, the fan duct becomes an integral part of the surrounding support structure which is in turn connected directly to the aircraft wing. Thus, the aerodynamic drag forces on the fan duct are transmitted from the fan housing directly to the wing structure, and not back to the engine core housing. The result is that with this engine installation, there is a substantially greater force exerted directly on the main thrust link.

The main thrust link is necessarily connected to the engine core housing at a location spaced radially outwardly from the longitudinal axis of the engine. Since the thrust force developed by the engine is along its longitudinal center axis, this creates with the force exerted by the thrust link a force couple of a substantial magnitude which is reacted into the engine core housing structure, tending to rotate the engine in a manner such that that forward end of the engine would move upwardly and the rear end of the engine move downwardly. In the typical prior art engine installation, this force couple is counteracted at two locations. First, there is the rear mounting device which connects to the engine core housing a substantial distance rearwardly of the forward connecting end of the thrust link and which transmits vertical, lateral and torsional loads from the engine core housing into the adjacent support structure. Second, there is the forward mounting device connecting to the core housing at the general location of the forward connecting end of the thrust link and arranged to transmit vertical and lateral loads from the core housing into the support structure. These two connecting devices create a force couple counteracting that created by the thrust link and the engine thrust.

The effect of these two force coupled is to create bending moments in the core housing, and these are largely resisted by the structure of the core housing itself. However, in engine designs which place greater loads on the thrust link, such as the wing mounted engine with mixed flow nozzle installation, where the force couple created by the thrust link and the engine thrust create a force couple of yet greater magnitude, it is desirable that attention be given to compensating for such force loads without the necessity of further reinforcing the structure of the core housing itself. It is to this problem that the present invention is particularly directed.

With regard to the various mounting devices shown in the U.S. patent literature, the following are presumed to be representative.

U.S. Pat. No. 3,063,661, Smith, discloses broadly an engine core mounting system for an engine with coplanar exhaust nozzles. There are shown some link units extending downwardly to engage the engine core.

U.S. Pat. No. 3,352,114, Wild et al, discloses a mounting system for a jet engine which consists of six links in three pairs. These attach in pairs to three parts of the engine case and extend outwardly and rearwardly to attach at four points to an annular frame.

U.S. Pat. No. 3,397,855, Newland, discloses a two link wish-bone rear mount for an engine. The two links extend tangentially from the engine case and attach to a mounting bracket.

U.S. Pat. No. 3,592,421, Kopp, discloses a supporting apparatus for a jet engine of a vertical take-off and landing aircraft. The engine is supported by mounting rods which are oriented in planes normal to one another. There are two tangent mounting rods forward of the engine, one vertical and one horizontal, which tie into a single point on a support frame. On the rear part of the engine are two vertical support rods, one on either side of the engine.

U.S. Pat. No. 3,675,418, Lenkelt et al, discloses a particular configuration of a thrust link for a jet engine. However, it does not disclose any details of support devices for vertical, lateral or torsional loads.

U.S. Pat. No. 3,750,983, Morris, discloses an engine mount for a Rolls Royce duct and fan engine. It has for and aft mounts for supporting the engine to the main support structure. The aft mount supports the core engine with a pair of two upwardly slanting links an also with a torsion resisting link. The forward mount consists of two links connecting the fan casing to the main support strut. Also there is a "Y" shaped thrust link which ties into the core engine at a forward location and into the main support strut at a point just forward of the aft mount.

The following patents are noted as being generally representative of various mounting devices known in the prior art: U.S. Pat. Nos. 3,809,340 Dolgy et al; 3,831,888 Baker et al; 3,837,602, Mullins; 3,844,115, Fried; 3,907,220, Amelio; 2,753,140, Hasbrouck et al; 2,815,184, Westphal et al; 3,042,349, Pirtle et al; and 3,222,017, Bobo.

SUMMARY OF THE INVENTION

The present invention is particularly adapted to mount a jet engine having a core engine section and a fan section. The core engine section has a core housing with a front portion, a rear portion and a longitudinal axis. The fan section has a fan case at the front end of the core housing, and the fan case is rigidly connected to the engine core housing and positioned radially outwardly therefrom. The present invention is particularly adapted for use in such an engine having an outer fan duct cowling extending along and positioned radially outwardly from the engine core housing to define a fan duct extending to the rear portion of the engine core housing, with the engine connecting directly to a wing of an aircraft.

The mounting apparatus of the present invention comprises a main support structure positioned radially outwardly of the core housing and having a rear end proximate the rear end of the engine core housing, and a forward end proximate the fan case. There is a main thrust link having a rear end connecting to the rear end of the support structure at a first upper location spaced radially from the longitudinal center axis by a greater radial distance. The thrust link has a forward end connecting to the forward end of the core housing at a second location at a lesser radial distance from the longitudinal center axis of the core housing, in a manner that the main thrust link counter-acts thrust loads developed by the engine by exerting a force having both a horizontal force component and a vertical force component.

A rear support device connects between the rear portion of the support structure and the rear portion of the engine core housing at a third location spaced rearwardly a substantial distance from the second connecting location of the front end of the thrust link, with said rear support device being arranged to resist both vertical and lateral loads. A pair of laterally spaced forward support devices connect side portions of the fan case to the support structure at fourth connecting locations forward of the second connecting locations of the forward end of the thrust link. The two forward support devices connect to said fan case at a plurality of symmetrically spaced locations around a circumference of the fan case.

When the engine operates to develop a substantial thrust generally along its longitudinal axis, this thrust is resisted by the thrust link in a manner to create a first force couple on said engine. The rear support device and the forward support device create an opposite force couple, with the rear support device exerting its force on said rear portion of the core housing, and with said forward support devices exerting their forces in a symmetrical pattern about the circumference of the fan case.

In the preferred configuration, each of the forward mounting devices comprises tangent links extending from the main support structure generally tangentially to the fan case in a manner that each tangent link exerts a resisting force on the fan case with the main force component of each link being generally tangent to the circumference of the fan case. Specifically, each of the forward mounting devices comprises a pair of oppositely extending tangent links, one of said links extending upwardly to connect to the fan case at an upper tangent location, and the other extending downwardly to connect to the fan case at a lower tangent location. Desirably, the two forward mounting devices are pivotally mounted to the main support structure in a manner to permit limited rotation about a generally transverse horizontal axis.

Preferably the rear mounting device comprises a pair of rear support links pivotally connected between the engine core housing and the support structure at spaced pivot locations. The pivot locations are spaced from one another in a manner that the support links are slanted with respect to one another, so that the two rear support links support both vertical and lateral loads without providing substantial resistance to torsional loads on the engine, and with the tangent links on the forward mounting devices providing substantial resistance to torsional forces exerted on the engine.

DESCRIPTION OF THE PREFERRED EMBODIMENT

Figure 1:
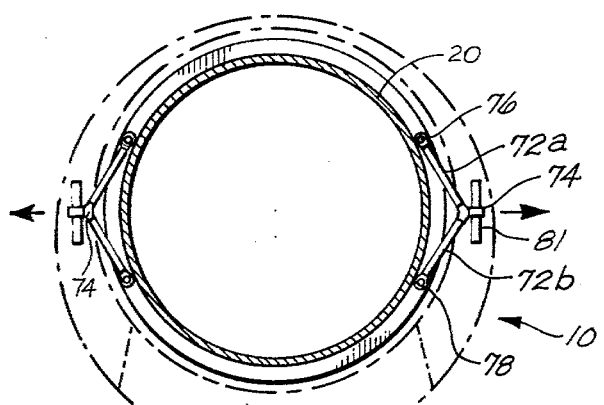
FIG. 1 is a transverse sectional view taken through the fan section of the engine shown in FIG. 3.
Figure 2:
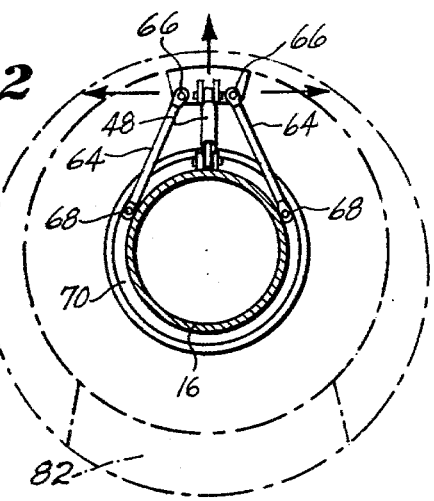
FIG. 2 is a transverse sectional view taken through the engine immediately aft of the fan section.

The engine 10 of the present invention is mounted to the forward end of a wing 12 of an airplane, with the engine 10 extending forwardly of the wing 12. The engine 10 comprises a core engine 14 enclosed by a core housing 16, and a fan section 18 having an outer fan case 20 containing a fan 22. The core engine 14 contains the usual engine components, namely a forward compressor, a combustion section, and a rear turbine section. For ease of illustration, these are not shown herein.

The engine 10 has a forward inlet 24 and a cowling 26 aligned with and extending rearwardly from the inlet 24 and defining a bypass passageway 28 located downstream of the fan 22 and surrounding the engine core 14. The aft end of the cowling 28 merges into a rear discharge section 30 where air flowing through the bypass airway 28 merges with the exhaust gases emitted from the exhaust end 32 of the core engine 14. In the particular engine shown herein, the combined exhaust of the bypass air and the exhaust gases from the core engine are discharged over the upper surface of the wing 12.

Figure 5:
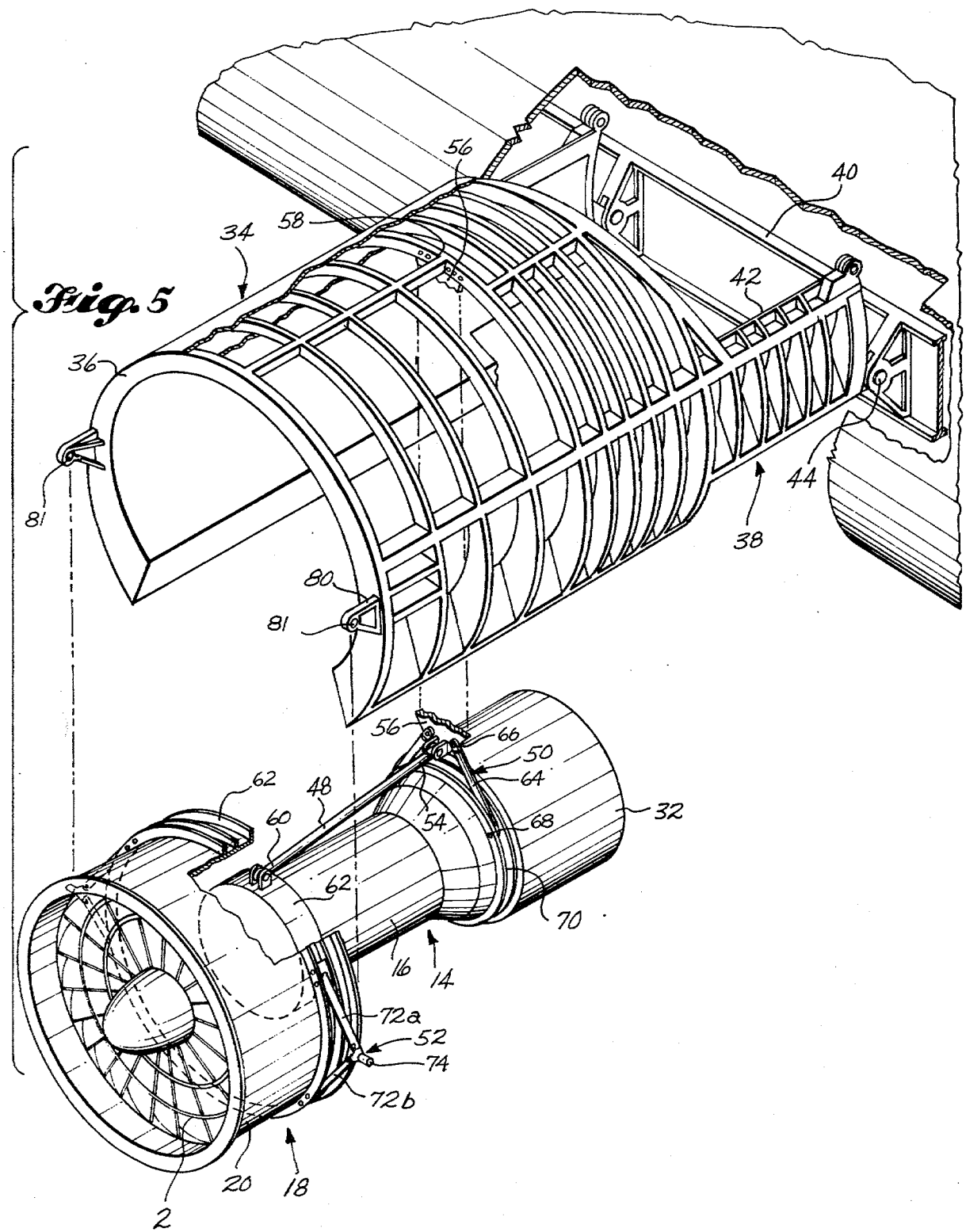
FIG. 5 is a perspective view of the present invention, with the inlet and cowling member being eliminated for purposes of illustration, and showing the core engine and fan section removed from the main support structure.

To describe now the main components of the engine mounting apparatus of the present invention, reference is made first to FIG. 5. There is a main support structure 34 (sometimes called the "strut") having a generally cylindrical configuration with a forward end 36 located adjacent to the fan case 20 and positioned within the cowling 26, and a rear end 38 connected to a front spar 40 of the wing 12. In the particular arrangement shown herein, the support structure 34 has two rearwardly extending arms 42 pivotally connected at 44 to the spar 40. An additional support member is positioned at a foward location on the supporting structure 34 in the form of a support link (not shown herein for ease of illustration) connected between the structure 34 and the fuselage of the airplane to which the engine 10 is mounted. That particular arrangement of the forward support link and rear pivot connections 44 are the subject of a separate patent application and therefore are not described in detail herein.

The present invention is concerned with the manner of mounting the core engine 14 and the fan section 18 to the main support structure 34, this being accomplished by four main components. These four components are a main thrust link 48, a rear mounting device 50 and two laterally spaced forward mounting devices 52.

The main thrust link 48 has a rear end 54 connected to an upper support bracket 56 which is in turn connected to the main support structure 34 at an upper rear location 58. The forward end 60 of the thrust link 48 connects to the engine core housing 16 at the upper forward end thereof, with the engine core housing 16 being provided with a circumferential reinforcing ring 62 at the location of the connecting forward end 60. Thus, the thrust link 48 extends forwardly and downwardly at a moderate slant. It should be noted that this particular arrangement of the thrust link 48 is, of itself, substantially the same as that of the General Electric CF6-50 engine.

The rear mounting device 50 comprises two support links 64, each of which is sufficiently rigid to take both tension and compression loads. The upper ends of the support link 64 connect at 66 to the aforementioned upper support bracket 56 at laterally spaced locations thereon. The two support links 64 extend downwardly and outwardly from their upper connecting points 66 to connect at their lower ends 68 to a circumferential mounting ring 70 located proximate the rear end of the engine core housing 16. At their lower connecting ends 68, the links 64 are nearly tangent with the ring 70.

Each of the two forward mounting devices 52 comprises a pair of tangent links 72 which connect to one another at respective side connecting locations 74. The two side locations 74 of the two forward mounting devices 52 are positioned at diametrically opposed locations with respect to the fan case 20 and are positioned at approximately the mid-height of the fan case 20. From its connecting location 74, the two tangent links 72 extend divergently from one another, one upwardly and one downwardly, with the upper link 72a connecting to the fan case 20 at an upper location 76, and the lower tangent link 72b connecting to the fan case 20 at a lower location 78. At the upper and lower connecting locations 76 and 78, the links 72a and 72b are nearly tangent to the circumference of the fan case 20. At the forward end 36 of the main support structure 34, there are two diametrically opposed mounting brackets 80, each of which is pivotally connected at 81 at a related connecting point 74 of two related tangent links 72. Each of the links 72 is sufficiently rigid to take both tension and compression loads. The mountings at 81 permit limited relative rotation between the fan case 20 and structure 34 about a horizontal transverse axis. Each of the tangent links 72 has ball joints at each end, making it impossible to develop fore and aft loads at 81.

The main support structure 34 is an elongate unitary structure having a transverse cross section that curves in approximately a 270° arc, so as to have a generally cylindrical configuration with an open bottom portion which is closed by a door 82. Thus, as illustrated in FIG. 5, the core engine 14 and fan section 18 can be mounted to the main structure 34 by opening the door 82 (not shown in FIG. 5) and moving the core engine and fan section 18 as a unit upwardly into the structure 34.

Figure 3:
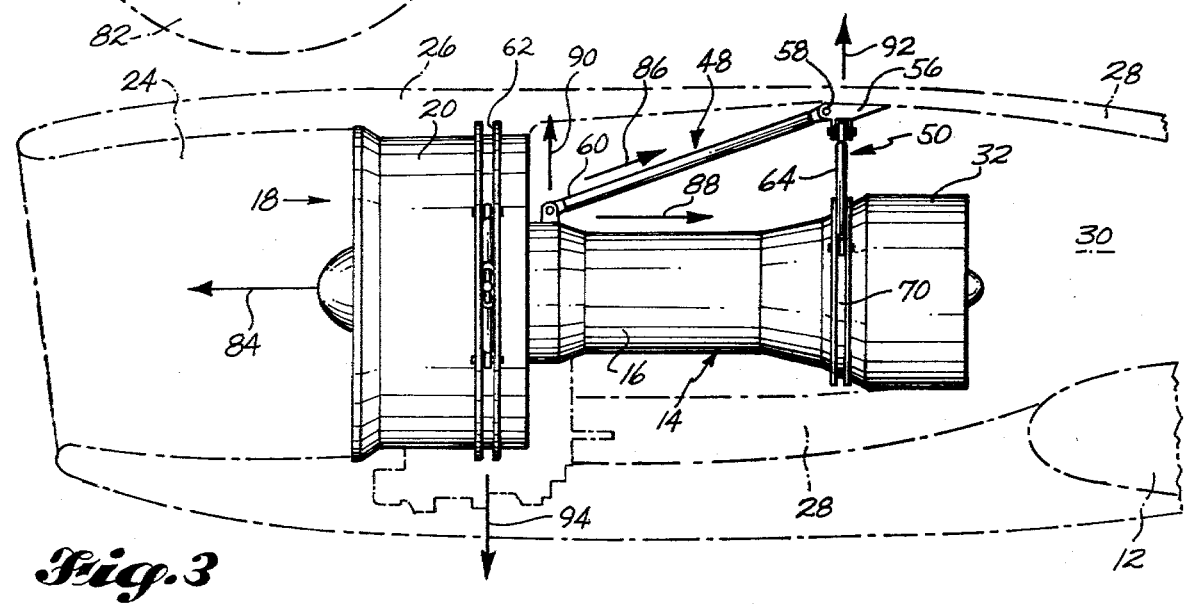
FIG. 3 is a side view of an engine incorporating the present invention, with outer portions thereof being shown in section.
Figure 4:
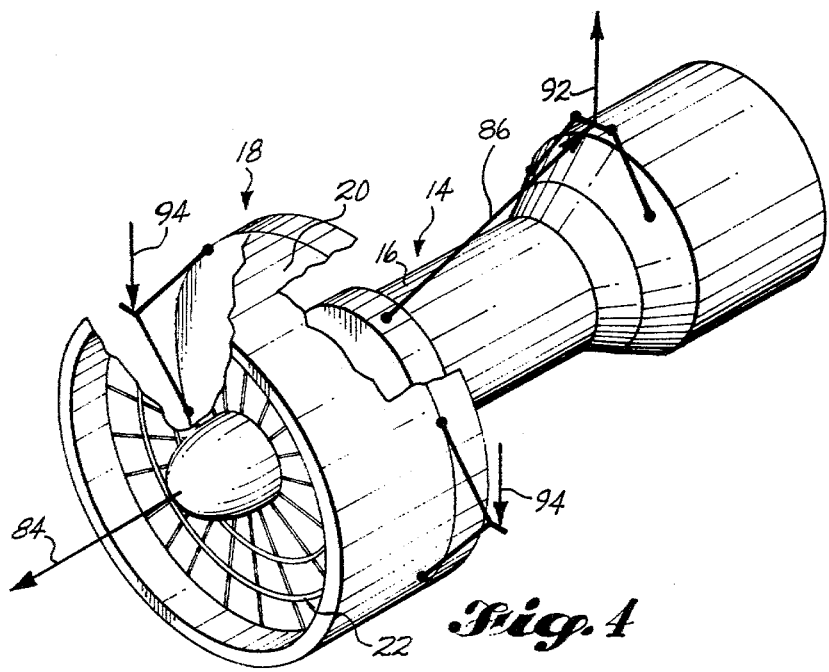
FIG. 4 is an isometric view of the core engine and fan section of the engine illustrating somewhat schematically the main components of the mounting structure of the present invention and the force vectors exerted by these components.

With regard to the manner in which the mounting apparatus of the present invention functions, when the engine 10 is not operating, the only requirement is to support the dead weight of the engine 10, and this is accomplished quite simply with the forward and rear mounting devices 52 and 50 being the main sources of support. However, when the engine 10 is operating at or near full power, it developes a substantial thrust force many times greater than the weight of the engine itself. This thrust force is represented in FIGS. 3 and 4 by the force vector 84. It can be seen that this thrust force 84 is directed along a line substantially coincident with the center axis of the engine 10.

The thrust link 48 resists the force 84 by being loaded in tension along a line extending from its forward end 60 to its rear end 54, this force vector being indicated at 86 in FIGS. 3 and 4. This force vector 86 has a horizontal force component 88, opposite and approximately equal to the thrust vector 84, and a vertical component 90. It can be seen in FIG. 3 that the thrust force 84 and the horizontal component 88 form a force couple which tends to rotate the engine 10 in a manner that the forward end of the engine 10 moves upwardly and the rear end thereof moves downwardly.

The above force couple 88-84 is resisted by the rear and forward mounting devices 50 and 52. The rear mounting device 50 pulls upwardly on the aft end of the core engine 14, and this force vector is indicated at 92. The two forward mounting devices 52 exert a downward force on the engine fan case 22, with these force vectors being indicated at 94. Thus, the two forward mounting devices 52 are actually pushing the engine 10 downwardly to resist the upward force component 90 developed by the thrust link 48.

It should be noted that the connecting locations 76 and 78 of the four tangent links 72 of the two forward mounting devices 52 are arranged in a symmetrical pattern at spaced locations around the circumference of the fan case 20. Thus the forces that are transmitted into the fan case 20 by the links 72 are in a symmetrical pattern which diminishes the tendency of such force loads to distort the fan case 20. Also, the links 72 are so arranged that they can adequately resist any lateral loads which might be exerted on the engine 10. With regard to torsional loads on the engine 10, the four tangent links 72 of the forward mounting devices 52 resist such torsional loads through the fan case 20 and transmit these torsion loads into the forward part of the main support structure 34.

As indicated earlier, the rear mounting device 50 exerts an upward vertical force at the rear of the core engine 14. Additionally, the two support links 64 of the rear mounting device 50 act to resist lateral loads at the rear of the engine 10. However, since the two links 64 are pivotally mounted at both of their connecting locations 66 and 68, they do not provide substantial resistance to torsional loads on the engine 10. Rather, as indicated above, the main torsional forces developed by the engine 10 are transmitted by the two forward mounting devices 52 into the main structure 34.

Figure 6:
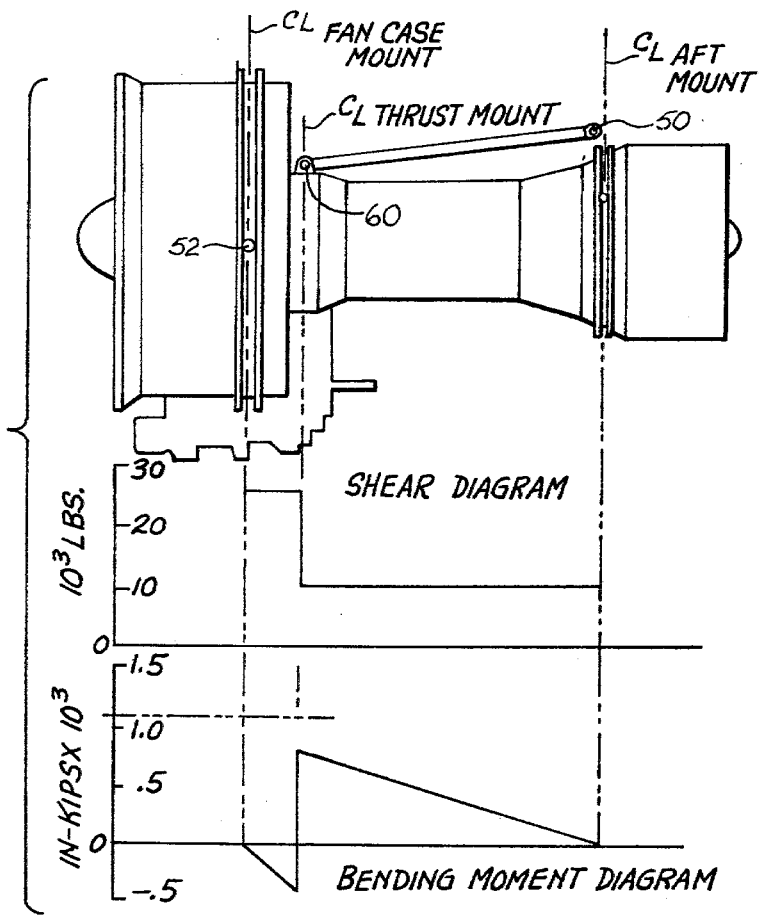
FIG. 6 presents two graphs illustrating the bending moments and shear forces exerted on the engine with the mounting system of the present invention.

Reference is now made to FIG. 6, which illustrates the bending moments and shear forces exerted on an engine 10 utilizing the mounting apparatus of the present invention. In this analysis, it is assumed that the weight of the core engine 14 and fan section 18 is 10,000 pounds, and that the engine 10 is developing a thrust of about 56,000 pounds. With regard to the shear forces, it can be seen that from the location of the rear mounting device 50 to the forward connecting point 60 of the thrust link 48, the shear force that is developed along the longitudinal axis of the engine 10 is approximately 10,000 pounds. From the location of the forward connecting point 58 of the thrust link 48 to the longitudinal location of the two forward mounting devices 52, the shear force increases to approximately 25,000 pounds. However, with the forward mounting devices 52 distributing the force symmetrically about the circumference of the case 20, these shear forces do not create any substantial distortion of the fan case 20.

With regard to the bending moments, it can be seen that from the location of the rear mounting device 50 to the forward connecting point 60 of the thrust link 48, the bending moment reaches a maximum of approximately 800,000 inch pounds. From the location of the forward connecting point 60 of the thrust link 48 to the longitudinal location of the two forward mounting devices 52, there is an opposite bending moment which is between about 400,000 to 500,000 inch pounds. In the particular engine analyzed in the graphs of FIG. 6, the upper limit of bending moment which can be tolerated in the engine core 14 is at a level of approximately 1,110,000 inch pounds, this level being indicated in the lower graph of FIG. 6. Thus, it can readily be appreciated that the bending moments created by the mounting structure of the present invention are well within the limits which can be tolerated in the engine 10.

What is claimed is:

1. In a jet engine having a core engine section and a fan section, said core engine section having a core housing with a front portion, a rear portion and a longitudinal center axis, said fan section having a fan case at the front end of the core housing, said fan case being rigidly connected to the engine core housing and positioned radially outward therefrom, a mounting apparatus for said engine, said apparatus comprising:

a. a main support structure positioned radially outwardly of the core housing and having a rear end proximate the rear end of the engine core housing and a forward end proximate said fan case and having two forward side mounting portions on opposite sides of said fan case, b. a main thrust link having a rear end connecting to the rear end of the support structure at a first upper location spaced radially from said longitudinal center axis a greater radial distance, and a forward end connecting to the forward end of the core housing at a second location at a lesser radial distance from the longitudinal center axis of the engine core housing, in a manner that said main thrust link counteracts thrust loads developed by the engine by exerting a force having both a horizontal force component and a vertical force component, c. a rear support device connecting between the rear portion of the support structure and the rear portion of the engine core housing at a third location spaced rearwardly a substantial distance from the second connecting location of the front end of the thrust link, said rear support device being arranged to resist both vertical and lateral loads, d. two sets of tangent links, said sets being positioned on opposite sides of said fan case, each set comprising:

1. an upper link having a first end connected to a related one of said forward side mounting portions, with the upper link extending upwardly from its first end to a second end of the upper link, which second end is connected to said fan case at a related upper side portion of the fan case, said upper link having its first and second ends in a line generally tangentially aligned with said fan case so as to transmit substantially tangential loads into said fan case, 2. a lower link having a first end connected to said related one of said forward side mounting portions, with the lower link extending downwardly from its first end to a second end of the lower link, which second end is connected to said fan case at a related lower side portion of the fan case, said lower link having its first and second ends in a line generally tangentially aligned with said fan case so as to transmit substantially tangential loads into said fan case, whereby with said engine operating to develop a substantial thrust generally along the longitudinal axis, and with this thrust being resisted by the thrust link in a manner to create a first force couple on said engine, said rear support device and said sets of tangent links create an opposite force couple, with the rear support device exerting its force on said rear engine portion, and with said sets of tangent links exerting their forces in a symmetrical pattern about the circumference of the fan case.

2. The apparatus as recited in claim 1, wherein said two sets of tangent links are pivotally mounted to said main support structure to permit limited rotation of said fan case relative to said main support structure about a generally transverse horizontal axis.

3. The apparatus as recited in claim 2, wherein said rear mounting device comprises a pair of rear support links pivotally connected between said engine core housing and said support structure at spaced pivot locations, with said pivot locations being spaced from one another in a manner that said rear support links are at a slant with respect to one another, whereby said two rear support links resist both vertical and lateral loads, without providing substantial resistance to torsional loads on said engine, and with said tangent links providing substantial resistance to torsional forces exerted on said engine.

4. The apparatus as recited in claim 1, wherein said rear mounting device comprises a pair of rear support links pivotally connected between said engine core housing and said support structure at spaced pivot locations, with said pivot locations being spaced from one another in a manner that said rear support links are at a slant with respect to one another, whereby said two rear support links resist both vertical and lateral loads, without providing substantial resistance to torsional loads on said engine, and with said tangent links providing substantial resistance to torsional forces exerted on said engine.

5. In a jet engine having a core section and a fan section, said core section having a core housing with a front portion, a rear portion and a longitudinal axis, said fan section having a fan housing at the front of the core housing, said fan housing being connected to the front portion of the core housing and positioned radially outwardly therefrom, said engine further having an outer fan duct cowling extending along and radially outwardly from said engine core housing to define a fan duct extending to the rear portion of the engine core housing, a mounting apparatus for connecting said engine directly to a wing of an aircraft, said apparatus comprising:
 a. a generally cylindrical support structure positioned radially outwardly of said engine core housing and having a rear end connecting to said wing and a forward end connecting to and being proximate said fan case, said structure being mounted in said engine cowling and substantially enclosing the engine core housing,
 b. a main thrust link having a rear end connecting to the rear end of the support structure at a first upper location spaced radially from said longitudinal center axis a greater radial distance, and a forward end connecting to the forward end of the core housing at a second location at a lesser radial distance from the longitudinal center axis of the engine core housing, in a manner that said main thrust link counteracts thrust loads developed by the engine by exerting a force having both a horizontal force component and a vertical force component,
 c. a rear support device connecting between the rear portion of the support structure and the rear portion of the engine core housing at a third location spaced rearwardly a substantial distance from the second connecting location of the front end of the thrust link, said rear support device being arranged to resist both vertical and lateral loads,
 d. two sets of tangent links, said sets being positioned on opposite sides of said fan case, each set comprising:
  1. an upper link having a first end connected to a related one of said forward side mounting portions, with the upper link extending upwardly from its first end to a second end of the upper link, which second end is connected to said fan case at a related upper side portion of the fan case, said upper link having its first and second ends in a line generally tangentially aligned with said fan case so as to transmit substantially tangential loads into said fan case,
  2. a lower link having a first end connected to said related one of said forward side mounting portions, with the lower link extending downwardly from its first end to a second end of the lower link, which second end is connected to said fan case at a related lower side portion of the fan case, said lower link having its first and second ends in a line generally tangentially aligned with said fan case so as to transmit substantially tangential loads into said fan case,
whereby with said engine operating to develop a substantial thrust generally along the longitudinal axis, and with this thrust being resisted by the thrust link in a manner to create a first force couple on said engine, said rear support device and said sets of tangent links create an opposite force couple, with the rear support device exerting its force on said rear engine portion, and with said sets of tangent links exerting their forces in a symmetrical pattern about the circumference of the fan case.

6. The apparatus as recited in claim 5, wherein said two sets of tangent links are pivotally mounted to said main support structure to permit limited rotation of said fan case relative to said main support structure about a generally transverse horizontal axis.

7. The apparatus as recited in claim 6, wherein said rear mounting device comprises a pair of rear support links pivotally connected between said engine core housing and said support structure at spaced pivot locations, with said pivot locations being spaced from one another in a manner that said rear support links are at a slant with respect to one another, whereby said two rear support links resist both vertical and lateral loads, without providing substantial resistance to torsional loads on said engine, and with said tangent links providing substantial resistance to torsional forces exerted on said engine.

8. The apparatus as recited in claim 5, wherein said rear mounting device comprises a pair of rear support links pivotally connected between said engine core housing and said support structure at spaced pivot locations, with said pivot locations being spaced from one another in a manner that said rear support links are at a slant with respect to one another, whereby said two rear support links resist both vertical and lateral loads, without providing substantial resistance to torsional loads on said engine, and with said tangent links on said forward mounting devices providing substantial resistance to torsional forces exerted on said engine.

* * * * *